(12) United States Patent
Iyer (10) Patent No.: US 11,148,344 B1
(45) Date of Patent: Oct. 19, 2021

(54) BLOW MOLDING METHOD AND APPARATUS

(71) Applicant: ELC MANAGEMENT LLC, Melville, NY (US)

(72) Inventor: Sushil Iyer, Astoria, NY (US)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 16/854,741

(22) Filed: Apr. 21, 2020

(51) Int. Cl.
| | |
|---|---|
| *B29C 49/48* | (2006.01) |
| *B29C 49/52* | (2006.01) |
| *B29C 49/78* | (2006.01) |
| *B29C 49/00* | (2006.01) |
| *B29L 31/00* | (2006.01) |
| *B29C 49/28* | (2006.01) |

(52) U.S. Cl.
CPC ...... *B29C 49/4823* (2013.01); *B29C 49/0005* (2013.01); *B29C 49/52* (2013.01); *B29C 49/786* (2013.01); *B29C 49/28* (2013.01); *B29C 2049/4828* (2013.01); *B29C 2049/4835* (2013.01); *B29C 2049/4841* (2013.01); *B29L 2031/7158* (2013.01)

(58) Field of Classification Search
CPC ........ B29C 49/4823; B29C 2049/4828; B29C 2049/4841; B29C 49/52; B29C 49/786
See application file for complete search history.

(56) References Cited

U.S. PATENT DOCUMENTS

| | | | | |
|---|---|---|---|---|
| 5,041,247 | A | * | 8/1991 | Kim .................... B29C 49/4823 264/37.1 |
| 5,232,653 | A | * | 8/1993 | Addeo .................... B29C 33/02 264/515 |
| 6,106,762 | A | | 8/2000 | Agur et al. |
| 2003/0143351 | A1 | | 7/2003 | Kannari et al. |

(Continued)

FOREIGN PATENT DOCUMENTS

| | | |
|---|---|---|
| CN | 109414842 A | 3/2019 |
| JP | 55021234 A * | 2/1980 ......... B29C 49/4823 |

(Continued)

OTHER PUBLICATIONS

PCT International Search Report; International Application No. PCT/US2021/028510; Completion Date: Aug. 11, 2021; dated Aug. 11, 2021.

(Continued)

*Primary Examiner* — Robert B Davis
(74) *Attorney, Agent, or Firm* — Tiffany A. Johnson (57) ABSTRACT

In a method of forming a container from a thermoplastic material, a thermoplastic preform may be introduced into a blow cavity at a temperature greater than or equal to a glass transition temperature of a thermoplastic material and less than a melting temperature of the thermoplastic material. A fluid pressure may be introduced into a preform that may expand the preform radially outwardly to form a semi-finished container. An external surface of the semi-finished container may be engaged with a wall of the blow cavity. The wall of the blow cavity may be rapidly heated. Heat may (Continued)

be transferred to the external surface of the semi-finished container. A surface finish may be imparted from the wall of the blow cavity onto the external surface of the semi-finished container.

15 Claims, 9 Drawing Sheets

(56) References Cited

U.S. PATENT DOCUMENTS

2004/0222566 A1    11/2004  Park
2008/0136066 A1 *  6/2008  Taylor .................. B29C 48/875
                                                                  264/486

FOREIGN PATENT DOCUMENTS

| JP | 08174552 A * | 7/1996 | ......... B29C 49/4823 |
| KR | 10-2003-0011666 | 2/2003 | |
| WO | WO-2011091780 A2 * | 8/2011 | ......... B29C 49/4823 |
| WO | WO-2016206080 A1 * | 12/2016 | ......... B29C 49/4823 |

OTHER PUBLICATIONS

PCT Written Opinion of the International Searching Authority; International Application No. PCT/US2021/028510; Completion Date: Aug. 11, 2021; dated Aug. 11, 2021.

* cited by examiner

| SAMPLE | MICROGRAPH | Ra (μm) | Rz (μm) | RSm (μm) |
|---|---|---|---|---|
| Container E | | 0.4012 | 2.7845 | 41.6655 |
| Container R | | 1.5294 | 8.5857 | 109.5578 |

BLOW MOLDING METHOD AND APPARATUS

TECHNICAL FIELD

The invention relates to thermoplastic containers; more particularly, the invention relates to a method and apparatus for achieving high quality surface finishes on blow molded thermoplastic containers.

BACKGROUND

Figure 1:
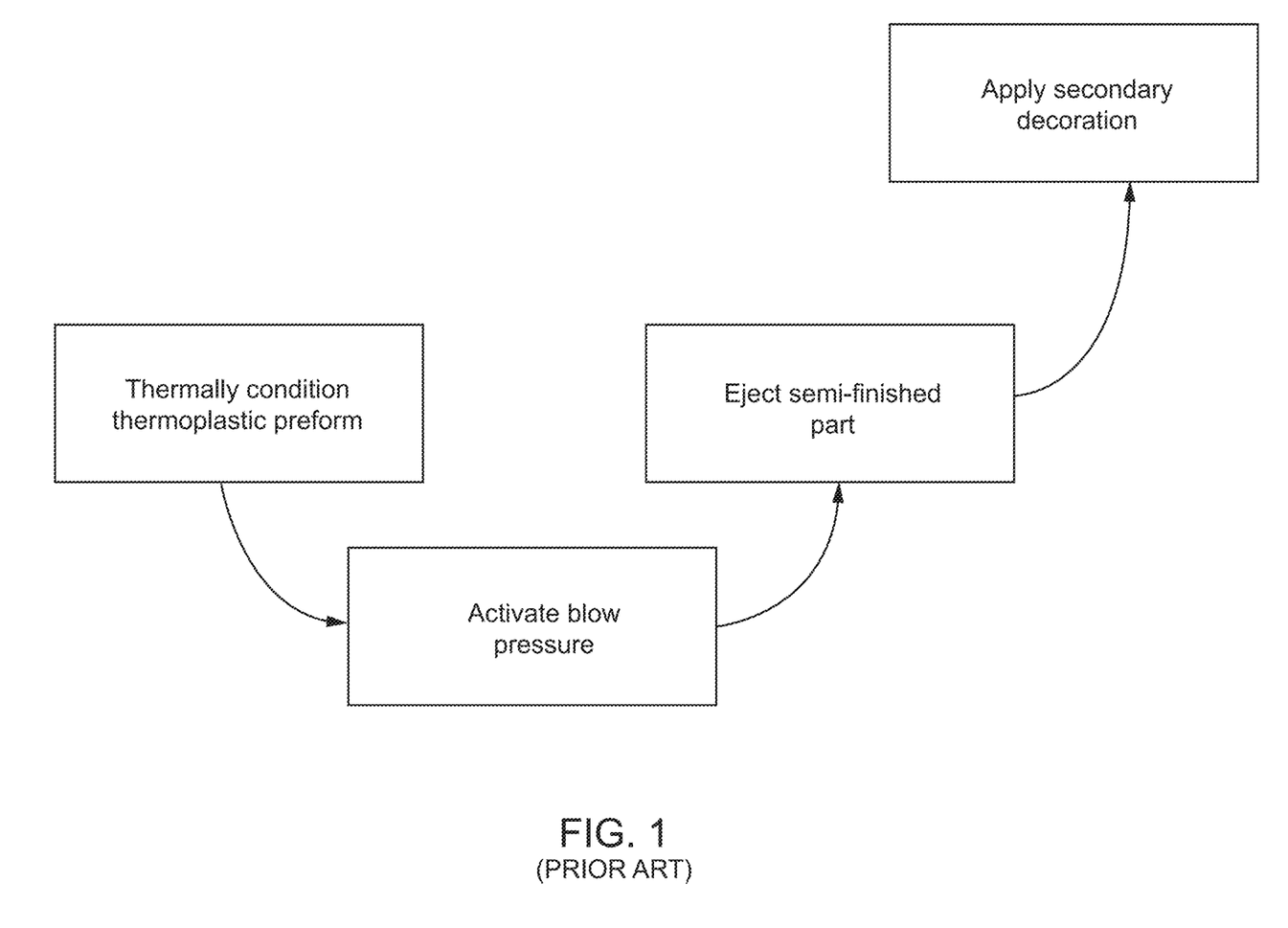
FIG. 1 is a diagram of a prior art blow molding process.

As represented in FIG. 1, blow molding is the process of forming a molten tube (hereinafter "parison" or "preform") of thermoplastic material including polymers and/or resins and placing the parison or preform within a blow cavity. The molten tube is inflated with compressed air to take the shape of the cavity and cooled before being removed from the mold.

Current conventional methods of achieving high-end surface finishes on blow molded thermoplastic containers can require a secondary decoration process, for example spraying, heat transferring, silk-screening, mechanical embossing, etc. These secondary processes are generally applied to a container subsequent to molding. In other words, achieving a high-end finish on thermoplastic containers generally requires subjecting the container to further processing subsequent to molding the container.

Heating and cooling technologies can be used in injection molding applications to obtain transfer or surface finishing from a mold to a part. In injection molding, thermoplastic material has a melting temperature above its melting point, as it enters a mold or cavity having a desired surface finish. The melting temperature is the actual temperature of the thermoplastic material as it exits the nozzle. Thus, the thermoplastic material can be in a completely molten state and solidify within the mold during the process, such that the mold surface finish can be transferred to the part, as the thermoplastic material solidifies. This molten state of the thermoplastic material can facilitate transfer of the surface finish to the part.

The present invention is provided to solve the problems discussed above and other problems, and to provide advantages and aspects not provided by prior thermoplastic containers and methods of producing the same. A full discussion of the features and advantages of the present invention is deferred to the following detailed description, which proceeds with reference to the accompanying drawings.

SUMMARY

One aspect of the present invention is directed to a method of forming a container from a thermoplastic material. The method comprises the steps of:
i. introducing a thermoplastic preform into a blow cavity at a temperature greater than or equal to a glass transition temperature of the thermoplastic preform and less than a melting temperature of the thermoplastic preform;
ii. introducing a fluid pressure into the preform to expand the preform radially outwardly to form a semi-finished container;
iii. engaging an external surface of the semi-finished container with a wall of the blow cavity;
iv. heating the wall of the blow cavity;
v. transferring heat to the external surface of the semi-finished container; and
vi. imparting a surface finish from the wall of the blow cavity onto the external surface of the semi-finished container.

This first aspect of the invention may include one or more of the following features, alone or in any reasonable combination. The method may further comprise the step of softening the external surface of the semi-finished container during the transferring heat step. The heating step may be accomplished by induction heating. The method may further comprise the step of applying a current to conductors within the mold and causing a magnetic field within the mold. The current may be an alternating current between 10 kHz and 50 kHz. A temperature of the wall of the blow cavity may be heated to a range between 60° and 130° C. The method may further comprise the step of performing the heating step for less than 6 seconds. The method may further comprise the step of cooling the wall of the blow cavity subsequent to the heating step. The cooling step may be performed after performing the heating step. The cooling step may comprise introducing a cooling fluid pressure into the mold via passages embedded in a body of the mold. The heating and cooling steps may be collectively performed for less than 40 seconds or until the mold reaches a temperature of less than 60° C.

A second aspect of the invention is directed to a thermoplastic blow molding apparatus. The apparatus comprises a mold comprising a mold body and a concave blow cavity formed therein. One or more electrical inductors are within the mold body. A source of an alternating current is connected across the inductor wherein a frequency of the alternating current is between 10 kHz and 50 kHz.

The second aspect of the invention may include one or more of the following features, alone or in any reasonable combination. The mold may be produced from a magnetic material. The magnetic material may be a tool steel. The thermoplastic blow molding apparatus may further comprise cooling passages within the mold body. An electrical inductor of the one or more electrical inductors may be located within the cooling passage. An annular space may be formed within the cooling passage about the electrical inductor. The one or more electrical inductors may include portions spaced equally about a circumference of the concave blow cavity. The thermoplastic blow molding apparatus may further comprise a surface finish on a wall of the blow cavity which is configured to engage a semi-finished container within the blow cavity. The thermoplastic blow molding apparatus may further comprise a source of cooling fluid fluidly connected to the cooling passage.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In a blow molding process, a parison or preform (hereinafter "preform") enters a blow cavity in a solid condition above its glass transition temperature (Tg). This makes it challenging for high replication and transfer of an etched surface finish from a wall of the blow cavity to a finished or semi-finished part. However, the inventors have discovered that via a rapid heating of the blow cavity wall and by control of a blow pressure, a thermoplastic material above its glass transition temperature can be forced into an etched surface of the blow cavity wall to impart replication or transfer of the etched surface into an external surface of a finished or semi-finished part.

A process control of rapid heating, preform temperature, and blow pressure are key variables in obtaining a desired finish. Controlling these parameters achieves a much higher consistency, repeatability, and part quality compared to conventional the secondary methods of applying a surface finish. Additionally, without rapid heating of the blow cavity, the fine surface finishes on the surface of the blow cavity do not transfer to the part in a blow molding process, unlike injection molding where most of a surface finish will transfer without heat-cool, albeit with a lower resolution.

Thus, a main factor influencing the surface finish of a finished blow molded part is the cavity wall temperature. However, the preform temperature is important to ensure the part can be blown properly. The preform temperature varies depending on the material but should be at least at or above the Vicat softening temperature of the material being blown. It should be appreciated that the Vicat softening temperature may be utilized to compare heat characteristics of materials.

Here, "semi-finished" refers to the container as the preform is expanded up to and including to the part during removal from the blow molding process. This term contemplates that the part may undergo further processes, such as labeling, adding a container lid, etc., subsequent to the blow molding process. It should be appreciated that a part may be a container, bottle, package, and other forms of parts.

Thus, an aspect of the blow molding method and apparatus disclosed herein is that fine high quality surface finishes (macro, micro, and nano) visually and physically resembling surface finishes created by secondary methods can be achieved within a blow cavity of a mold by transferring such fine surface finishes etched into the blow cavity onto the parts blown into the blow cavity thereby eliminating the secondary process.

Relative to conventional processes, this novel method and apparatus may deliver improved consistency and repeatability of up to approximately 97%; improved decorative adhesion of silk screening, hot stamping, and heat transferring. As there is no spray layer affecting the potential adhesion, improved compatibility of the container may be achieved. Surface treatments, including, but not limited to, sprays and secondary decoration, do not impart incompatibility and stress to the container. Thus, cycle time is improved by at least 25% when using rapid cooling and induction heating. This may allow a wider range of target surface finishes without requiring tool or spray modification. Further, a wider range of materials may be utilized compared to injection molding because the surface replication is not dependent upon high melt temperature property materials. A "spray layer" as it is understood by one of ordinary skill is a layer of coating formed over an article via a coating process in which material(s) are sprayed on the surface of the article.

Figure 2:
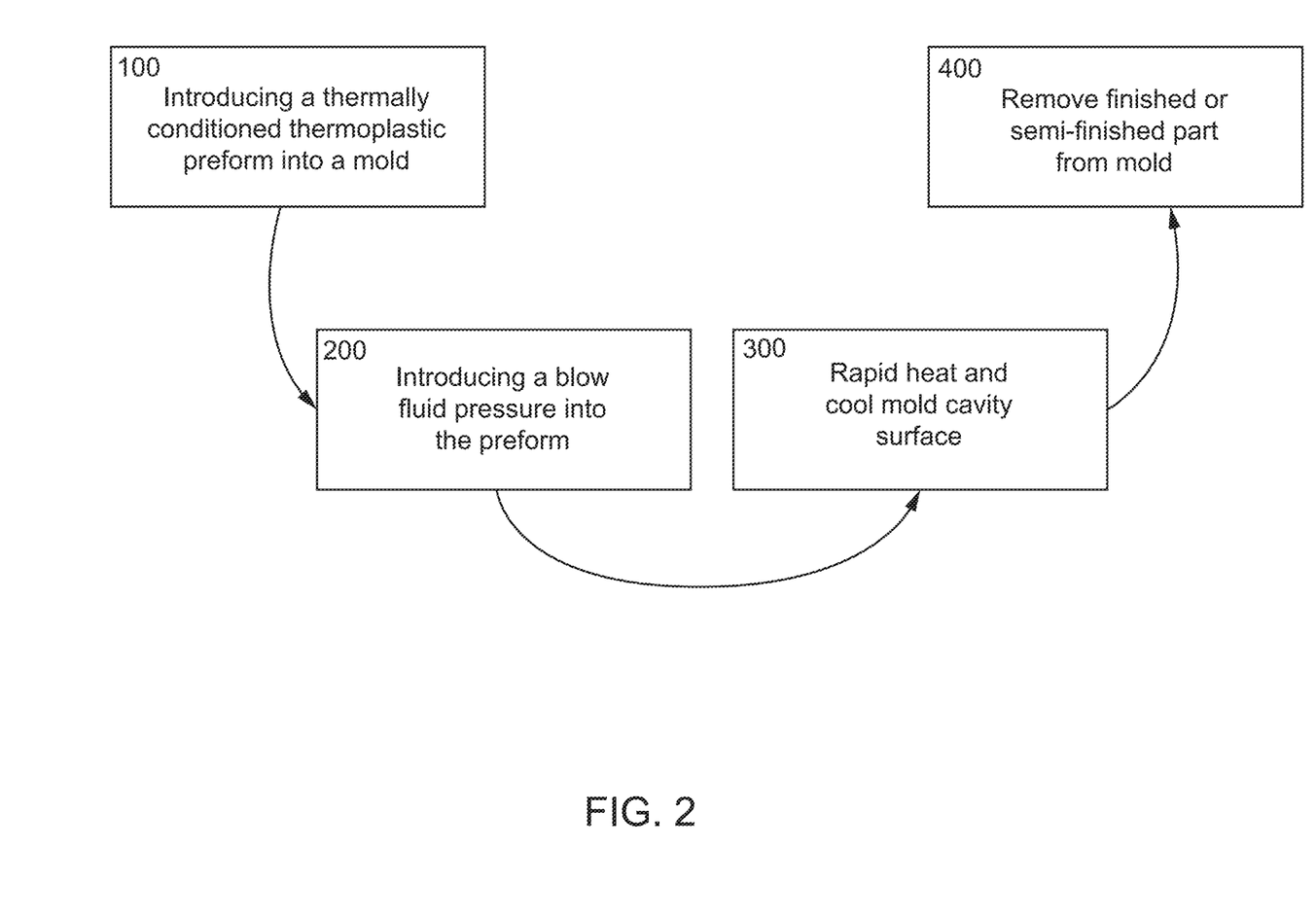
FIG. 2 is a diagram of a blow molding operation of the present invention.
Figure 3:
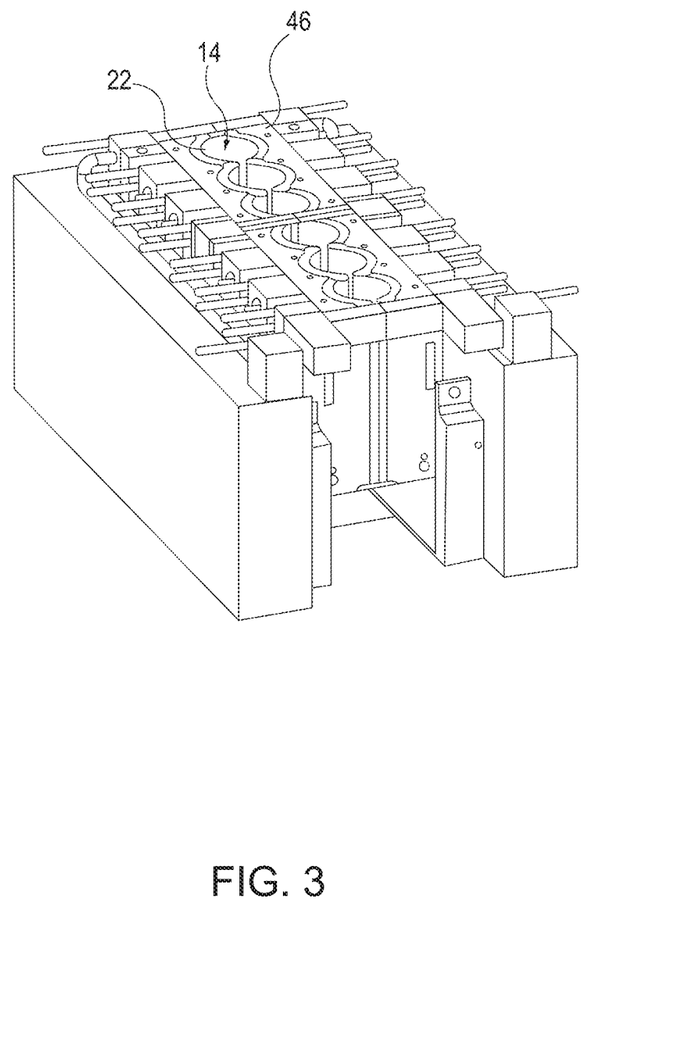
FIG. 3 is an elevated view of a mold for use in a blow molding operation of the present invention.
Figure 4:
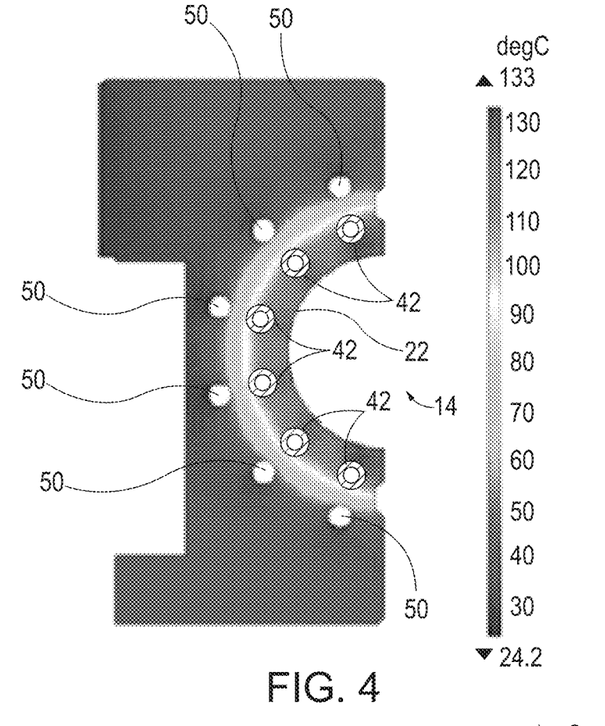
FIG. 4 is a cross-sectional view of a half-mold for use in a blow molding operation of the present invention showing temperature variability within the mold.
Figure 5:
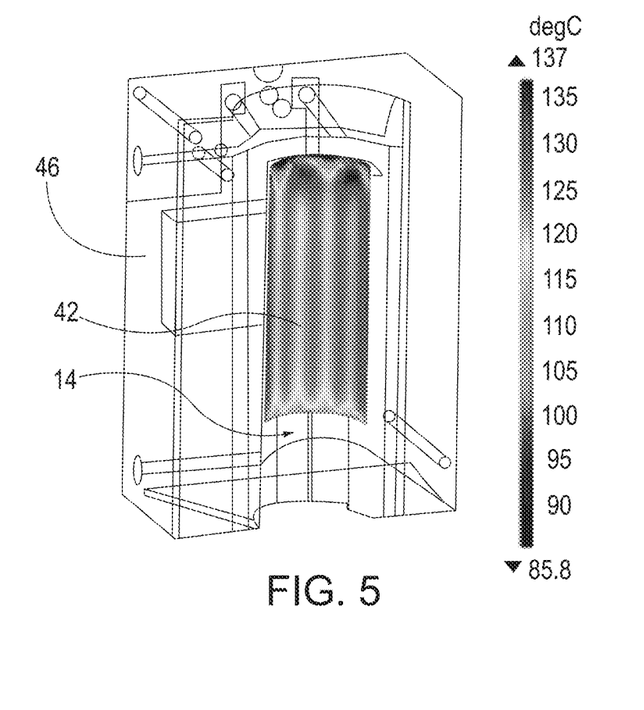
FIG. 5 is an alternative view of the mold of FIG. 4.
Figure 6:
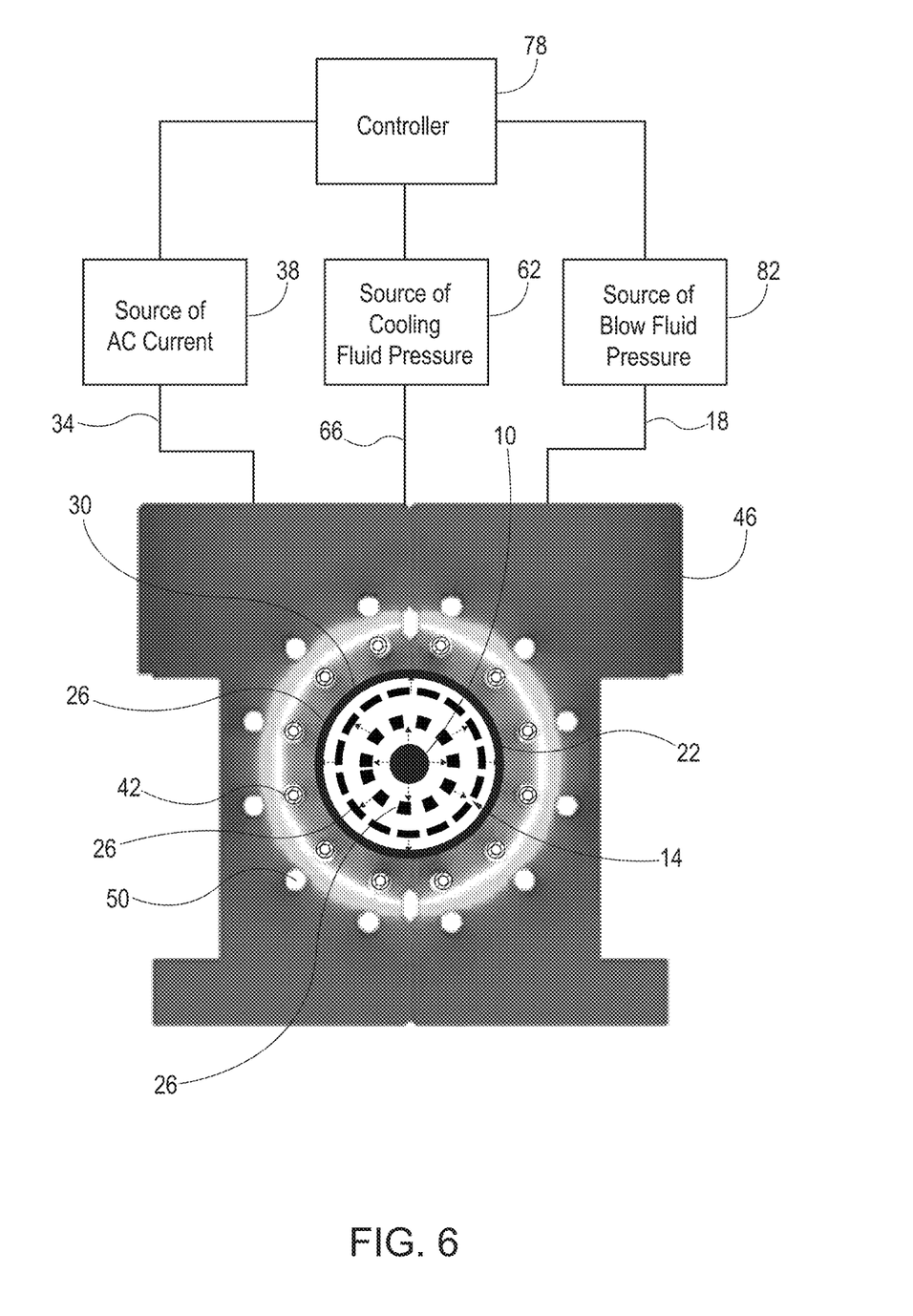
FIG. 6 is a schematic view of a blow molding apparatus of the present invention showing, among other things, an expansion of a preform radially outwardly until a semi-finished container engages a wall of a blow cavity.
Figure 7:
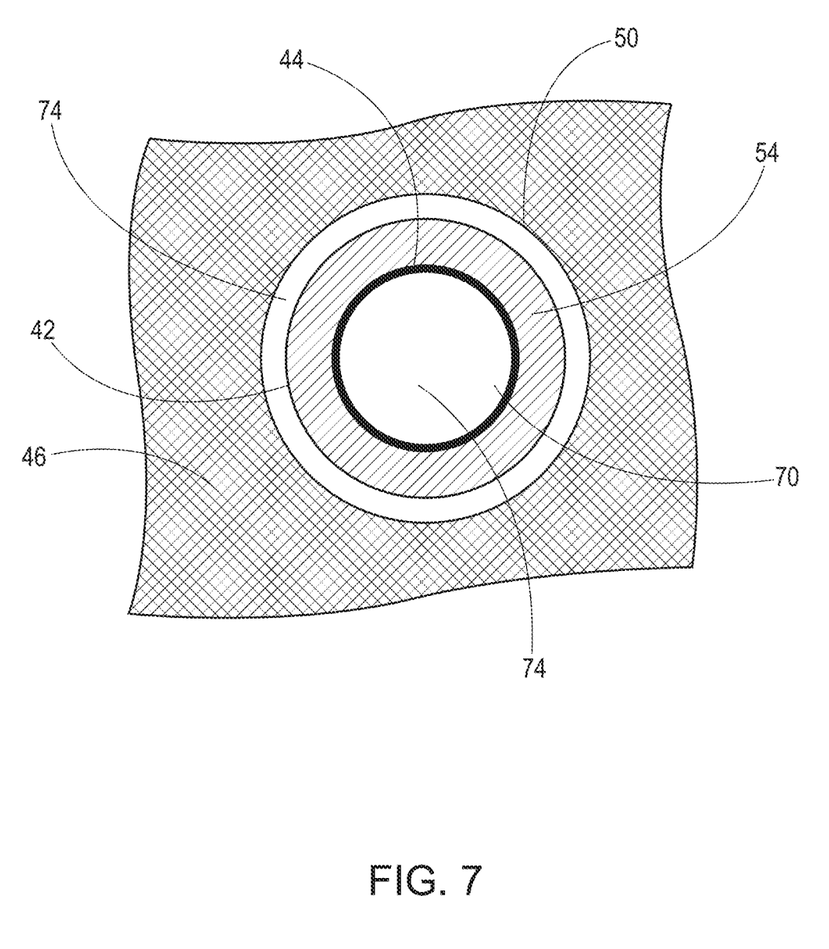
FIG. 7 is a partial cross-sectional view of a mold for use in a blow molding operation of the present invention showing a magnified view of an inductor, comprising a tubular conductor and an annular cooling passage about the inductor and a cooling passage through the tubular conductor.

Referring to FIG. 2, a novel method of the present invention comprises the steps of: introducing a thermally conditioned thermoplastic preform 10 (FIG. 6) into a blow cavity 14 (FIG. 6) (step 100); introducing a blow fluid pressure 18 (FIG. 6) into the preform 10 (step 200) and expanding the preform 10 radially outwardly against a wall 22 (FIG. 6) of the blow cavity 14; heating the wall 22 of the blow cavity 14 (step 300); and removing a finished or semi-finished container 26 (FIG. 6) from the mold (step 400). These steps are conventional as understood by one of ordinary skill in the art of blow molding. The expansion of the preform 10 into a semi-finished container 26, as illustrated in FIG. 6, provides intermediate stages of the semi-finished container 26 shown in dashed lines.

The method further comprises the step of rapidly heating the wall 22 of the blow cavity 14. This step allows heat transfer between the semi-finished container 26 wherein a surface finish of the wall 22 of the blow cavity 14 is transferred to an external surface 30 of the semi-finished container 26. This step requires a suitably designed apparatus, including a mold, one that includes means for rapidly heating the wall 22 of the blow cavity 14. Such molds are illustrated in FIGS. 3-7. The molds are heated via induction heating.

Induction heating is the process of heating an electrically conducting mold (usually a metal) by electromagnetic induction. Eddy currents generate heat within the mold.

An alternating inductive current 34 from a source 36 is applied to the inductors 42 at a frequency between 10 kHz and 300 kHz. This induces currents in the opposite direction in the passages 50 and an electromagnetic field 38 which causes a thermal diffusion to propagate to the wall of the blow cavity 14 (see FIG. 6). This is continued until a temperature of the wall 22 of the blow cavity 14 is heated to a range between 60° and 130° C. This temperature is suitable for softening the external surface 30 of the semi-finished container 26 upon engagement with the wall 22 of the blow cavity 14. Combined with the blow fluid pressure 18 delivered to an interior 58 of the semi-finished container 26 the softening allows transfer of the desired surface finish to the semi-finished container 26 external surface 30.

Accordingly, the mold is produced from a conducting material, such as a metallic material. Iron alloys are generally metallic materials. A 1.2343 (H11) magnetic tool steel having an electric resistivity of around 40Ω·m, a relative permeability of about 55, and a thermal conductivity of about 27 W/m·° K.

One or more inductors 42 are incorporated into a body 46 of the mold near the wall 22 of the blow cavity 14. The inductors 42 are evenly distributed in a magnetic material around the wall 22 of the blow cavity 14. In other words, the inductors 42 are equally spaced about the blow cavity 14 within the mold body 46. However, while ideal to have the inductors equally spaced, design constraints often prohibit such spacing, and desired results have been achieved when the inductors 42 are not equally spaced.

The inductors 42 comprise an electrical conductor 44, such as a braided copper wire of the like. These conductors 44 are located within a passage 50, or a network of passages 50, in the mold. The passages 50 can take the form of tubular-shaped channels, grooves, conduits and the like. The conductors 44 are lined with one or more insulating layers 54.

The alternating inductive current 34 at a frequency between 10 kHz and 300 kHz may be delivered from a source of an alternating current 36 which may be electrically connected to the inductors 42. This induces currents in the opposite direction in the passages 50 and an electromagnetic field which causes a thermal diffusion to propagate to the wall 22 of the blow cavity 14 (FIG. 6).

The method further comprises the step of rapidly cooling the mold subsequent to the heating step. Thus, the apparatus includes a means for cooling the mold. This can take the form of further passages 50 passing though the mold, longitudinally and or transverse to a height of the mold, and fluidly connected to a source of a cooling fluid pressure 62. The cooling fluid can be injected into the passages 50 to rapidly cool the mold and/or control the thermal diffusion. Alternatively, or additionally, the cooling means may comprise a tubular conductor 70 that may allow the cooling fluid pressure 66 to flow therethrough.

Alternatively, or additionally, the cooling means comprises a space 74 between a circumferential wall of the conductor passages 50 and the insulating layers 54 of the conductor 44. A cooling fluid can then be introduced into the space 74 to cool the mold. Here, the space 74 is created by increasing the cross-sectional area of the passages 50 such that passage 50 cross-sectional area is substantially greater than the cross-sectional area of the conductor 44 and insulating layers 54. The term "substantially" as used in this context is intended to encompass a structure whereby the space 74 formed by a distance between the radially outermost portion of the conductor/insulating layer(s) and the passage wall is great enough to allow a flow of a fluid therethrough. The space 74 is preferably annular such that the space 74 forms a circumferential gap about the circumference of the conductor/insulating layer(s). In each case, the cooling fluid is made to flow through the mold between two heating cycles.

The apparatus and blow molding method are controlled by a suitable controller 78, such as a computer, microcontroller, hardwired control panel, data processor, etc. The controller 78 may have a non-transitory memory with one or more software routines. The software routines can control the heating/cooling cycling or duration, the operation of a source of a blow fluid pressure 82 in terms of duration pressure, volume, etc., a source of the alternating current 36, and the source of the cooling fluid pressure 62.

In a specific embodiment of the present invention, a thermoplastic preform 10 is introduced into a blow cavity 14 at a temperature which is greater than or equal to a glass transition temperature of the thermoplastic preform 10 and less than a melting temperature of the thermoplastic preform 10. A blow fluid pressure 18 is introduced into the preform 10 to expand the preform 10 radially outwardly to form a semi-finished container 26. The blow fluid pressure 18 continues wherein an external surface 30 of the semi-finished container 26 engages a wall 22 of the blow cavity 14. The wall 22 of the blow cavity 14 is heated by induction heating. A current is applied to conductors 44 within the mold body 46 and causes a magnetic field within the mold body 46. The current is an alternating current 34 between 10 kHz and 300 kHz. Heat is transferred to the external surface 30 of the semi-finished container 26. A temperature of the wall 22 of the blow cavity 14 is heated to a range between 60° and 130° Celsius within a duration less than 6 seconds. The heat from the heat transfer softens the external surface 30 of the semi-finished container 26. A surface finish from the wall 22 of the blow cavity 14 is imparted onto the external surface 30 of the semi-finished container 26. The wall 22 of the blow cavity 14 is cooled subsequent to the heating step. The cooling of the wall 22 includes a cooling fluid pressure 66 into the mold via passages 50 embedded in a body 46 of the mold. The heating and cooling steps are collectively performed for less than 40 total seconds or until the mold reaches a temperature of less than 60° Celsius.

Figure 8:
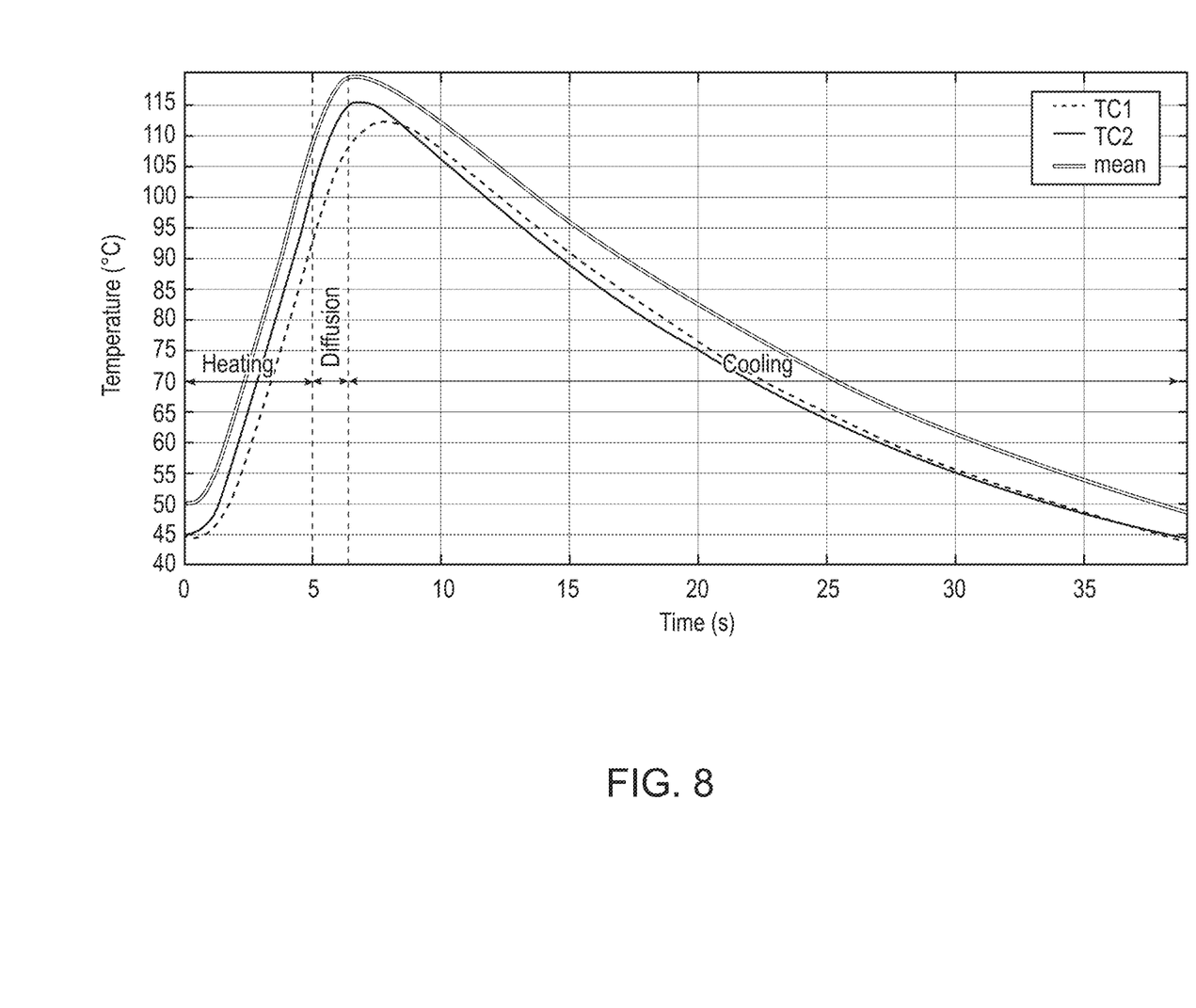
FIG. 8 is a graph of a blow molding rapid heating and cooling cycle.

Referring to FIG. 8, example heating/cooling cycles are illustrated according to an embodiment of the present disclosure. A heating cycle duration is 5 seconds and may increase mold temperature from less than 60° to approximately 90 to 108° Celsius. Diffusion of the heat continues to heat the mold above 110° Celsius. The cooling step begins and continues for a duration of about 35 seconds until the mold temperature reaches about 50° Celsius.

Figure 9:
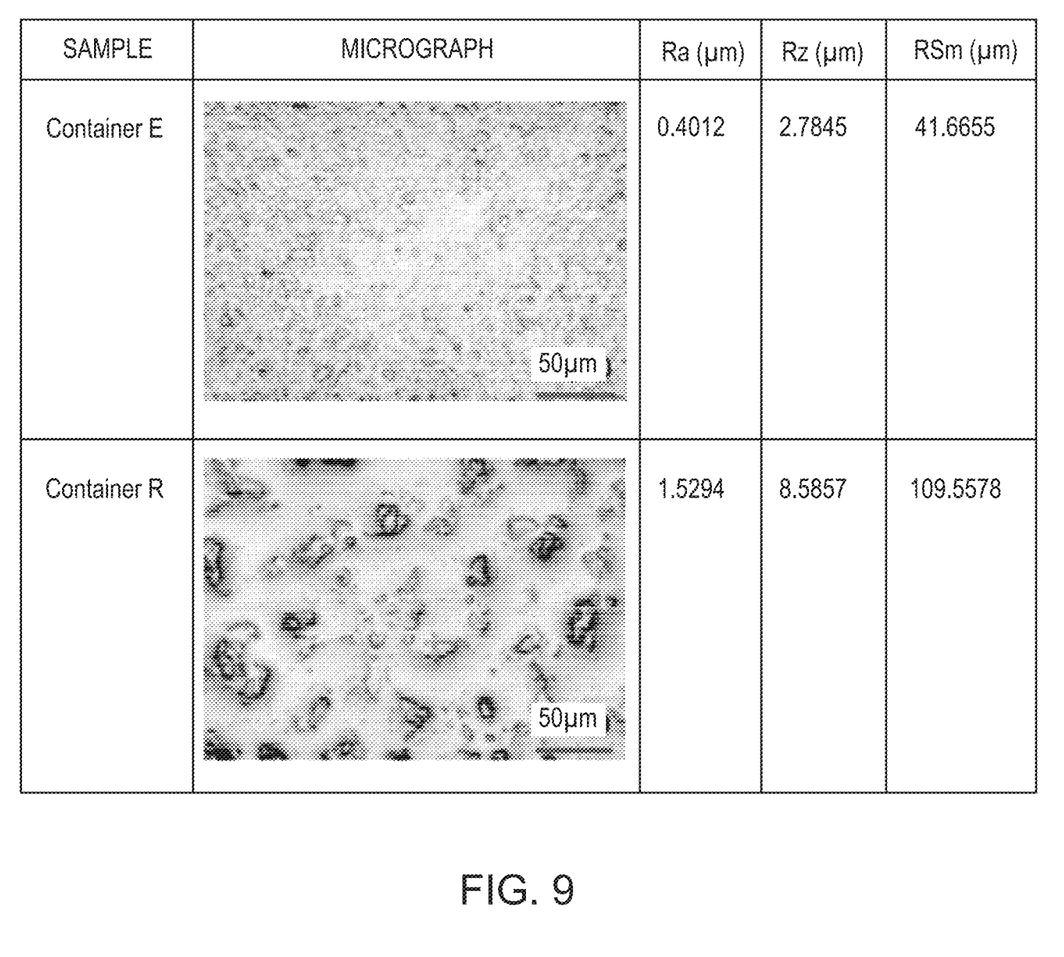
FIG. 9 is table comparison of a first container (hereinafter, "Container E") produced according to a prior art method and a second container (hereinafter, "Container R") produced according to a method of the current invention and using an apparatus of the present invention.

Referring to FIG. 9, an illustrative example of a container R produced according to the embodiment set forth above is compared to a container E produced according to the prior art. Container E was produced using a conventional blow molding method with plain (i.e. no surface finish) cavity. The surface finish of container E was achieved by prior art secondary process of spray coating-conventional spray method. Container R was produced using a blow cavity having a surface finish. The surface finish was transferred to the container R at 97% or higher replication. As shown in FIG. 9, $R_a$ is the average roughness of a surface; $R_z$ is the difference between the tallest "peak" and the deepest "valley" in the surfaces; and $R_{Sm}$ is the mean peak width. Container E may provide an $R_a$ of approximately 0.4012 micrometers (μm), an $R_z$ of approximately 2.7845 μm, and an $R_{Sm}$ of approximately 41.6655 μm. Container R may provide an $R_a$ of approximately 1.5294 μm, an $R_z$ of approximately 8.5857 μm, and an $R_{Sm}$ of approximately 109.5578 μm.

Figure 10:
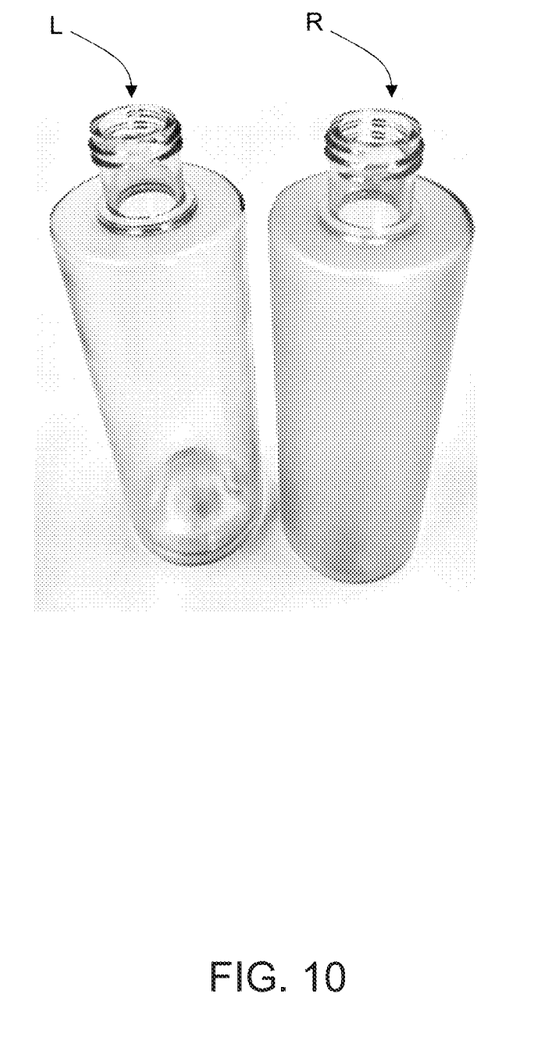
FIG. 10 is a side-by-side comparison of a container on the right (hereinafter, "R") produced according to the present invention and a container on the left (hereinafter, "L") produced in an identical blow cavity without rapid induction heating applied.

Referring to FIG. 10, container R, on the right, was, again, produced according to the embodiment set forth above is compared to a container L, on the left, produced according to the prior art. The containers E, L were produced using blow cavities having substantially identical cavity wall surface finishes. Transfer of the blow cavity wall surface finish to container R was greater than the transfer of the blow cavity wall surface finish to container L. In other words, container R was produced with induction heating applied while container L was produced without induction heating applied but within an identically surface finish on the blow cavity surface. Container L blown in the cavity which contained the fine surface finish but did not get transferred effectively since induction rapid heating-cooling was not applied. Container R was blown in that same cavity but with induction turned on, which enabled the fine surface finish to be transferred successfully.

Advantages of the present invention include the capability of blow molding high quality surface finishes onto packaging, within the mold itself, by applying heating/cooling technology to provide fine finishes transferred from the wall 22 of the blow cavity 14. This technology can be used in conjunction with, for example, extrusion blow molding, injection blow molding, injection stretching blow molding, etc. This process achieves a high-quality surface finish at a macro, micro, or nano-level. It allows blow molding different types and levels of surface finish without requiring different tooling or spray modifications. Importantly, it may eliminate secondary finishing decoration of containers while achieving fine and high-quality surface finishing. The new process achieves uniformity, consistency, and repeatability of surface finishing.

While the specific embodiments have been illustrated and described, numerous modifications come to mind without significantly departing from the spirit of the invention, and the scope of protection is only limited by the scope of the accompanying claims.

What is claimed is:

1. A method of forming a container from a thermoplastic material, comprising the steps of:
    introducing a thermoplastic preform into a blow cavity at a temperature greater than or equal to a glass transition temperature of the thermoplastic preform and less than a melting temperature of the thermoplastic preform;
    introducing a fluid pressure into the preform to expand the preform radially outwardly to form a semi-finished container;
    engaging an external surface of the semi-finished container with a wall of the blow cavity;
    heating the wall of the blow cavity;
    transferring heat to the external surface of the semi-finished container;
    imparting a surface finish from the wall of the blow cavity onto the external surface of the semi-finished container; and
    arranging one or more electrical inductors within a mold body and spacing portions of the one or more electrical inductors equally about a circumference of the blow cavity.

2. The method of claim 1, further comprising the step of:
    softening the external surface of the semi-finished container during the transferring heat step.

3. The method of claim 2, wherein the heating step is accomplished by induction heating.

4. The method of claim 3, further comprising the step of:
    applying a current to conductors within the mold and causing a magnetic field within the mold.

5. The method of claim 4, wherein the current is an alternating current between 10 kHz and 50 kHz.

6. The method of claim 5, wherein a temperature of the wall of the blow cavity is heated to a range between 60° and 130° Celsius.

7. The method of claim 6, further comprising the step of:
    performing the heating step for less than 6 seconds.

8. The method of claim 7, further comprising the step of:
    cooling the wall of the blow cavity subsequent to the heating step.

9. The method of claim 8, wherein the cooling step is performed after the step of performing the heating step.

10. The method of claim 9, wherein the cooling step comprises introducing a fluid pressure into the mold via passages embedded in a body of the mold.

11. The method of claim 10, wherein the heating and cooling steps are collectively performed for less than 40 seconds or until the mold reaches a temperature of less than 60° Celsius.

12. A thermoplastic blow molding apparatus comprising:
    a mold comprising a mold body and a concave blow cavity formed therein;
    one or more electrical inductors within the mold body;
    a source of an alternating current connected across the inductor wherein a frequency of the alternating current is between 10 kHz and 300 kHz,
    wherein the mold is produced from a magnetic material,
    wherein the magnetic material is a tool steel,
    wherein an electrical inductor of the one or more electrical inductors is located within the cooling passage,
    wherein an annular space is formed within the cooling passage about the electrical inductor, and
    wherein the one or more electrical inductors include portions spaced equally about a circumference of the concave blow cavity.

13. The thermoplastic blow molding apparatus of claim 12 further comprising a surface finish on a wall of the blow cavity configured to engage a semi-finished container within the blow cavity.

14. The thermoplastic blow molding apparatus of claim 13 further comprising a source of cooling fluid fluidly connected to the cooling passage.

15. A thermoplastic blow molding apparatus comprising:
    a mold comprising a mold body and a concave blow cavity formed therein;
    one or more electrical inductors within the mold body;
    a source of an alternating current connected across the inductor wherein a frequency of the alternating current is between 10 kHz and 300 kHz,
    wherein an electrical inductor of the one or more electrical inductors is located within or surrounded by the cooling passage, and
    wherein the one or more electrical inductors include portions spaced equally about a circumference of the concave blow cavity.

* * * * *